US008210130B1

(12) United States Patent
Bloomquist et al.

(10) Patent No.: US 8,210,130 B1
(45) Date of Patent: Jul. 3, 2012

(54) AUDIBLE PROD FOR LIVESTOCK (76) Inventors: Hadley Bloomquist, Pine City, MN (US); Christine Bloomquist, Pine City, MN (US)

( * ) Notice: Subject to any disclaimer, the term of this patent is extended or adjusted under 35 U.S.C. 154(b) by 321 days.

(21) Appl. No.: 12/630,393

(22) Filed: Dec. 3, 2009

Related U.S. Application Data (60) Provisional application No. 61/200,689, filed on Dec. 3, 2008.

(51) Int. Cl.
*B68B 11/00* (2006.01)
*A01K 29/00* (2006.01)
(52) U.S. Cl. .......................... 119/719; 231/2.1; 446/252
(58) Field of Classification Search .................. 119/712, 119/719, 801, 174, 905, 908; 231/2.1–7; 446/247, 252, 265
See application file for complete search history.

(56) References Cited

U.S. PATENT DOCUMENTS

| | | | |
|---|---|---|---|
| 193,872 A * | 8/1877 | Hopkins | ............................ 231/5 |
| 1,348,836 A | 8/1920 | Patremio | |
| 2,576,188 A | 11/1951 | McPherson | |
| 3,648,925 A | 3/1972 | Fryer | |
| 3,909,977 A | 10/1975 | Kirk | |
| 4,533,140 A * | 8/1985 | Champion | ......................... 231/3 |
| 4,615,685 A * | 10/1986 | Nelissen | ........................ 446/247 |
| 4,863,095 A * | 9/1989 | Crane | ............................. 231/2.1 |
| 5,078,643 A * | 1/1992 | Thill | .............................. 446/215 |
| 5,107,793 A | 4/1992 | Tymkewicz | |
| D351,627 S | 10/1994 | Beckwith | |
| 5,749,324 A | 5/1998 | Moore | |
| 6,055,940 A | 5/2000 | Koehn | |
| 6,752,746 B1 * | 6/2004 | Winkler et al. | .................. 482/82 |
| 2007/0181660 A1 | 8/2007 | Izyk | |

* cited by examiner

*Primary Examiner* — David Parsley
*Assistant Examiner* — Danielle Clerkley
(74) *Attorney, Agent, or Firm* — Montgomery Patent & Design, LLC; Robert C. Montgomery; Joseph T. Yaksich (57) ABSTRACT

A device designed to prod livestock is intended to create an audible sound to aid in the controlled movement of animals. The device takes the form of a long pole comprising an upper end provided with a comfortable handle and a wrist strap and a lower end provided with a whistle. To use, the user would hold the device by the handle in one hand and whip it in a fast, circular motion, causing the whistle to make a sound. When done near an animal, the sound will cause the animal to move away, thus allowing the user to control the movement of the animal. The device is suitable for use by farmers, ranchers, auctioneers, herdsmen, or anyone who loads or moves livestock.

19 Claims, 5 Drawing Sheets

AUDIBLE PROD FOR LIVESTOCK

RELATED APPLICATIONS

The present invention was first described in and claims the benefit of U.S. Provisional Application No. 61/200,689, filed Dec. 3, 2008, the entire disclosures of which are incorporated herein by reference.

FIELD OF THE INVENTION

The present invention relates generally to devices utilized in the handling of livestock, and in particular, to a prod provided with the capability to produce audible sounds designed to aid the herding and direction of livestock.

BACKGROUND OF THE INVENTION

Domesticated animals represent a major source of economy, food, and employment. Large livestock such as cattle are raised on expansive farms across the country. Such large expanses of farm are a basic requirement for raising such livestock, due to their need for exercise as well as their need for a constant source of fresh grazing areas. In addition to being moved for purposes of grazing, such animals must also be moved in a controlled manner for purposes such as feeding, buying, selling, marketing, and the like.

The need to move such animals occurs on a daily basis in large livestock operations. However, the movement can be somewhat difficult due to the large size and reluctance of the animals. Many traditional methods such as horses, whips, and dogs are unreliable, inefficient, and unpredictable. Current methods include items such as electric cattle prods; however, such methods are considered to be inhumane by many parties.

Various attempts have been made to provide apparatuses to aid in the control and movement of large animals or livestock. Examples of these attempts can be seen by reference to several U.S. patents. U.S. Pat. No. 2,576,188, issued in the name of McPherson, describes a cattle guard apparatus. The McPherson apparatus comprises a stationary fence-type animal deterring barrier which attempts to keep livestock or other such domesticated animals away from a specific area.

U.S. Pat. No. 6,055,940, issued in the name of Koehn, describes a animal sorting tool with a poking tip. The Koehn device is a tool specifically designed to prod animals for sorting purposes in a non-painful manner.

While these devices fulfill their respective, particular objectives, each of these references suffer from one (1) or more of the aforementioned disadvantages. Many such devices are expense to purchase or maintain, especially for small entity users. Also, many such devices are difficult or unwieldy to operate. In addition, many such devices are extremely heavy and uncomfortable when used over the course of hours or days. Furthermore, many such devices use means which are considered by some to be cruel, inhumane, or physically abusive in order to control the animals. Accordingly, there exists a need for a prod for livestock which allows a user to manipulate and move large animals without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a device which allows a user to prod, manipulate, or otherwise coax movement from large livestock animals in a manner which is simple, lightweight, and humane. Thus, the object of the present invention is to solve the aforementioned disadvantages and provide for this need.

To achieve the above objectives, it is an object of the present invention to comprise a rod, a whip, and a whistle.

Another object of the present invention is to comprise the rod of a lightweight, rigid material. In a preferred embodiment, the rod is approximately thirty inches long and cylindrical with a diameter of one-half of an inch. The rod further comprises a handle and a whip end. The handle provides a comfortable or ergonomic gripping handle constructed of a durable material. The whip end comprises the opposite end of the rod from the handle.

Yet still another object of the present invention is to comprise the whip of a durable, flexible length of single-strand or braided material such as nylon, leather, or the like. The whip is attached to the whip end via a first knot. The device further comprises a second knot which provides a means of attaching the whistle to the whip while also providing additional mass to the end of the whip, thus allowing a user to motion the whistle in a circular manner.

Yet still another object of the present invention is to comprise the whistle of a durable material such as thermoplastic or the like which is manufactured through common existing techniques. The whistle is designed such that it produces a loud "whistle" sound from a stream of forced air when spun in a fast, circular motion. The whistle causes a smooth flow of air to vibrate, thus making a sound and getting louder as the speed of the motion increases.

Yet still another object of the present invention is to comprise a lanyard, which provides a cord to secure the device to the wrist of a user. The lanyard comprises a loop which attaches to a lower surface of the rod via integral molding, knotting or tying to the rod, or the like.

Yet still another object of the present invention is to further comprise the whip end of the rod of a ball joint. The ball joint comprises a common ball joint which provides a connection means for the whip and allows the whip to rotate in a smooth fashion. The ball joint further comprises a ball joint arm and ball joint aperture.

Yet still another object of the present invention is to comprise a swivel member which provides a connection means between the whistle and the second knot. In a preferred embodiment, the swivel member comprises a conventional snap fishing swivel which comprises a clip and a pair of rings connected via a pivoting joint. The swivel member enables the whistle to swing in an appropriate direction and prevents the whistle from becoming entangled with the whip.

Yet still another object of the present invention is to provide a method of utilizing the device that provides a unique means of herding, directing, and separating livestock in a manner which is easy, simple and effective for a single user as well as physically harmless to the animals.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| 10 | audible prod for livestock |
|----|----|
| 20 | rod |
| 22 | handle |
| 24 | whip end |
| 25 | first knot |
| 26 | ball joint |
| 27 | ball joint arm |
| 28 | ball joint aperture |
| 30 | whip |
| 32 | second knot |
| 40 | whistle |
| 41 | upper whistle member |
| 42 | sound |
| 43 | lower whistle member |
| 44 | aperture |
| 45 | axle |
| 46 | swivel member |
| 47 | internal whistle member |
| 50 | lanyard |
| 60 | circular motion |
| 70 | user |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an audible prod for livestock (herein described as the "device") 10, which provides a means for humanely controlling and directing livestock through the use of audible sound 42 similar to a conventional whip or rattle prod. The device 10 generally comprises a rod 20, a whip 30, and a sound 42 producing whistle 40 which is utilized by farmers, ranchers, auctioneers, herdsmen, or anyone who loads or moves livestock. The use of the device 10 will enable a herdsman or the like to move or separate livestock in an effective and humane manner while requiring less help from people or dogs.

Figure 1:
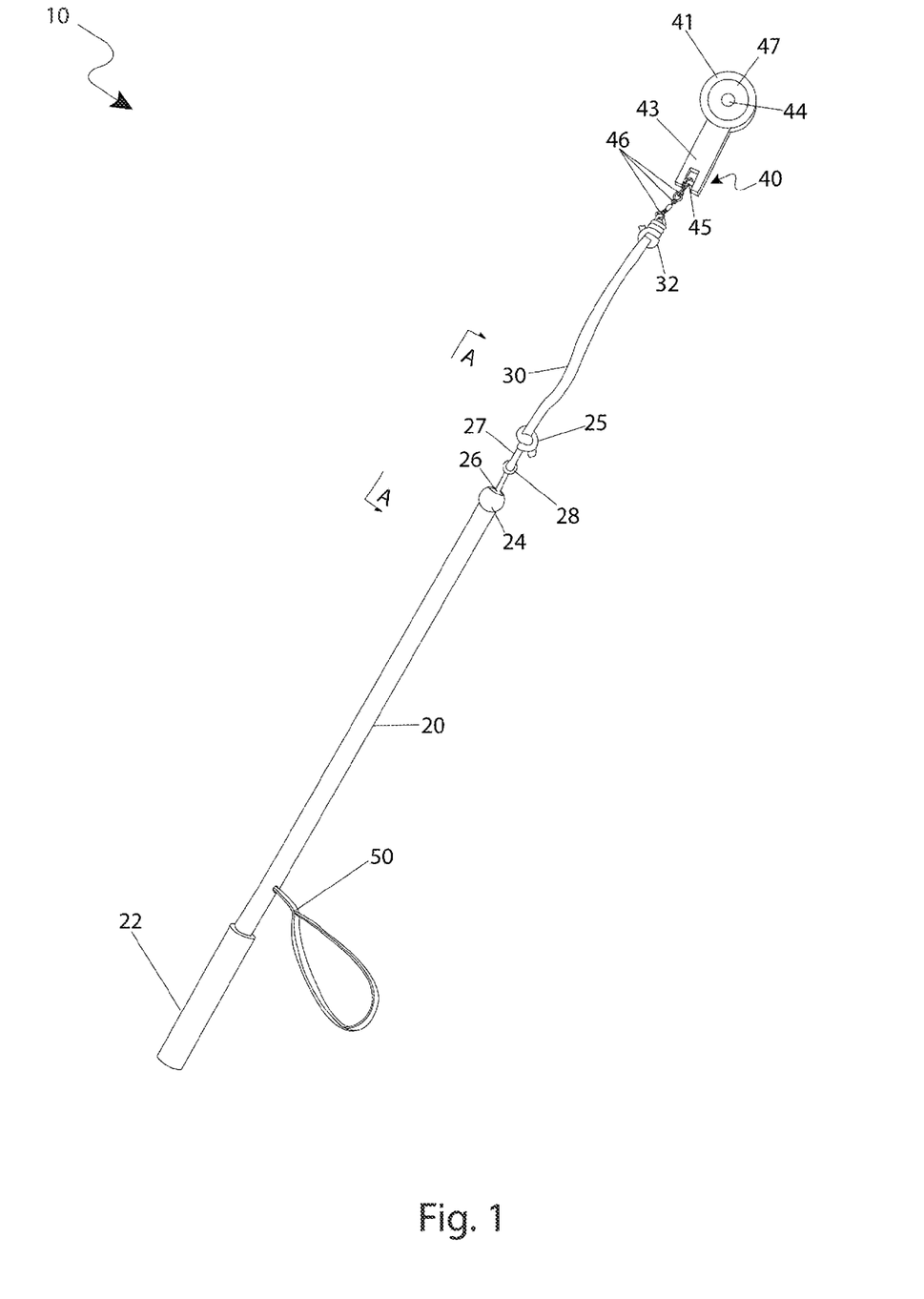
FIG. 1 is a side perspective view of an audible prod for livestock 10, according to a preferred embodiment of the present invention.

Referring now to FIG. 1, a side view of the device 10, according to the preferred embodiment of the present invention, is disclosed. The device 10 comprises a rod 20 preferably made of a light weight, rigid material such as thermoplastic, wood, carbon fiber, or the like and is approximately two-and-one-half (2½) feet long and one-half (½) inch in diameter. The rod 20 provides the main body for the device 10 and comprises a handle 22 and a whip end 24. The handle 22 is fabricated of a durable material such as, but not limited to: rubber, leather, or the like and provides a comfortable gripping surface to a user 70 while using the device 10 and may be introduced comprising ergonomic features such as finger grips and the like. The device 10 further comprises a whip 30 which is attached via a first knot 25 thereto the whip end 24 of the rod 20 (also see FIG. 3). The whip end 24 is located on an end of the rod 20 opposing the handle 22. The whip 30 comprises a durable, flexible length of single-strand or braided material such as nylon, leather, or the like. The device 10 further comprises a second knot 32 located thereon an end of the whip 30 opposing the whip end 24 of the rod 20. The second knot 32 provides a means of attaching a whistle 40 thereto the whip 30 and provides additional mass to the end of said whip 30 (also see FIGS. 4 and 5) which is necessary for motioning said whistle 40 in a circular motion.

Figure 2:
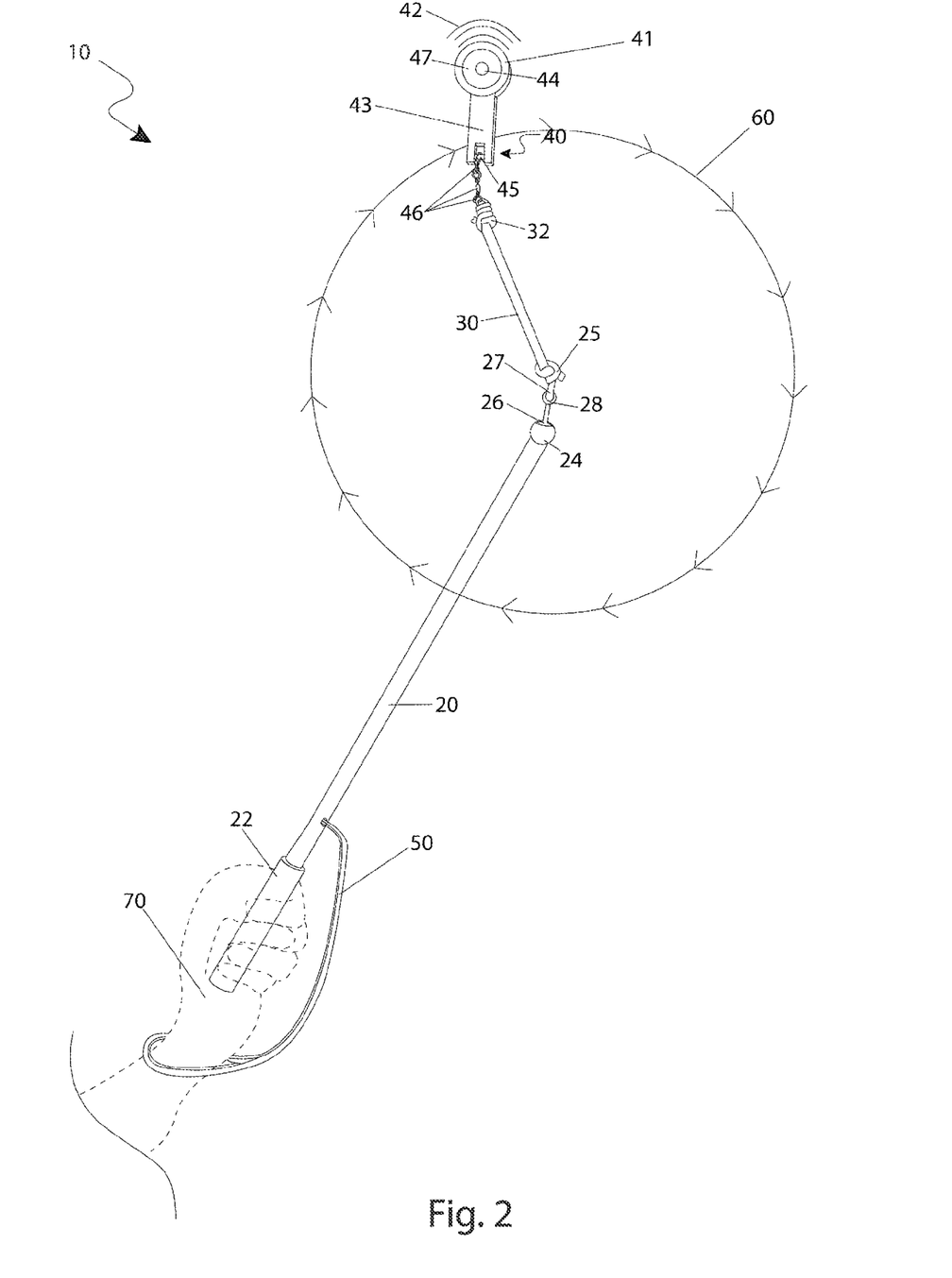
FIG. 2 is an environmental view of an audible prod for livestock 10, according to a preferred embodiment of the present invention.

Referring now to FIG. 2, an environmental view of the device 10, according to the preferred embodiment of the present invention, is disclosed. The device 10 comprises a whistle 40 which is attached to the whip 30 thereat the second knot 32. The second knot 32 enables the whistle 40 to be removed or replaced if required. The whistle 40 is preferably made of a durable material such as a thermoplastic or the like and be manufactured through common techniques. When spun in a fast, circular motion 60 the whistle 40 produces a loud "whistle" sound 42 from a stream of forced air. When spun the whistle 40 causes a smooth flow of air to vibrate, thereby further creating the "whistle" sound 42. The faster the whistle 40 is spun through the air the louder the "whistle" sound 42 will become.

The device 10 further comprises a lanyard 50, thereby providing a cord to secure said device 10 thereto the wrist of a user 70. The lanyard 50 comprises a loop which attaches thereto a lower surface of the rod 20 via integral molding, knotting or tying to the rod 20 in conventional techniques, or the like. Said lanyard 50 is fabricated from materials such as, but not limited to: nylon, leather, or the like and is an appropriate diameter to correspond to a variety of sized users.

Figure 3:
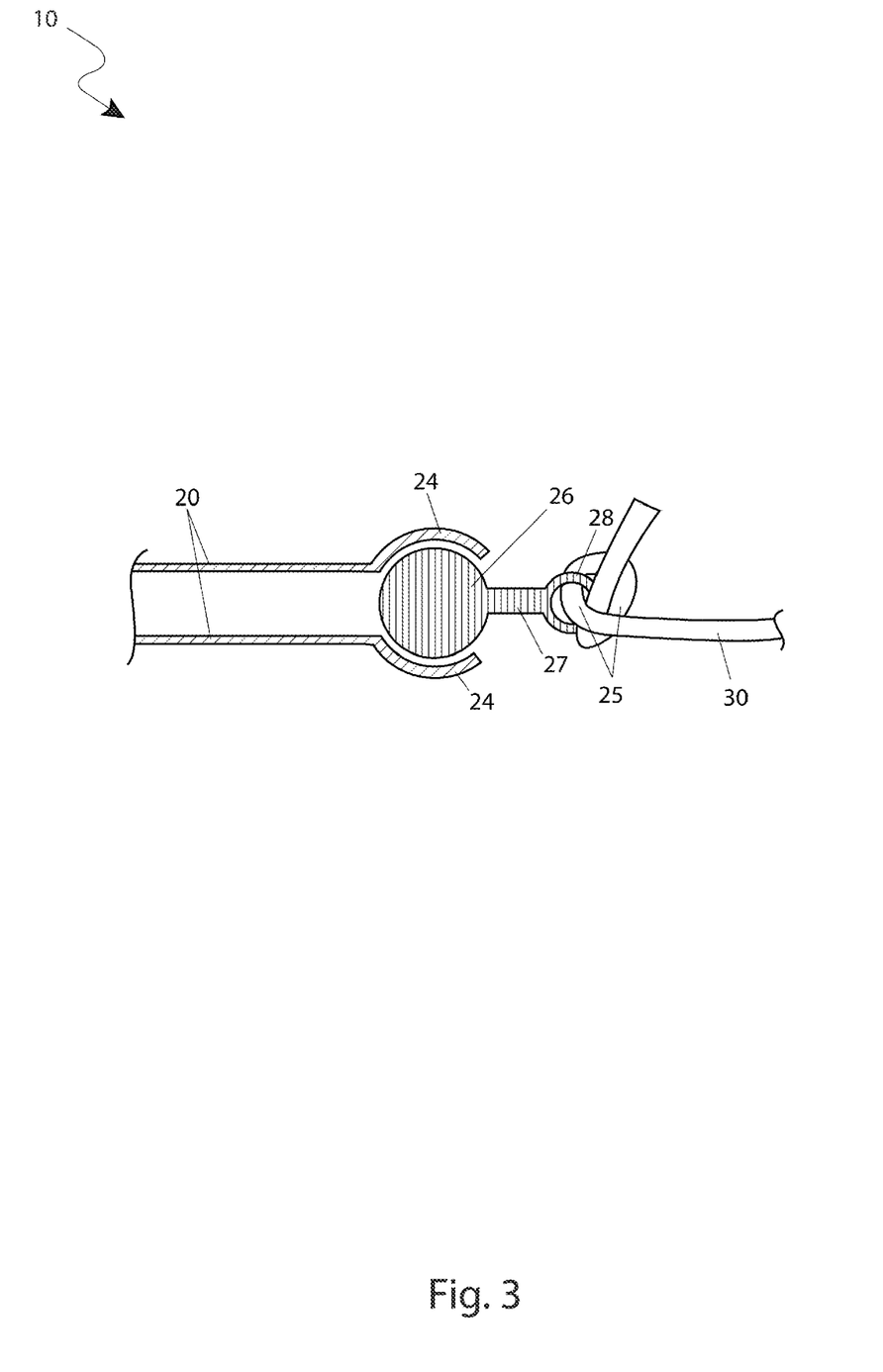
FIG. 3 is a section view of a whip end 24 taken along line A-A FIG. 1, according to a preferred embodiment of the present invention.

Referring now to FIG. 3, a section view of the whip end 24 taken along line A-A FIG. 1, according to the preferred embodiment of the present invention, is disclosed. The whip end 24 comprises a circular shape integrally molded to the rod 20, thereby partially encompassing and creating a knuckle for an internal ball joint 26 to rotate therein. The ball joint 26 rests there inside the whip end 24 and provides an attachment means to the whip 30. Said ball joint 26 is slightly smaller in diameter than the whip end 24, thereby enabling proper rotation of said ball joint 26 within. Said ball joint 26 comprises an intermediately positioned and integrally molded ball joint arm 27, thereby providing an extension to a ball joint aperture 28. The ball joint aperture 28 enables the whip 30 to be attached via a first knot 25. In use, as the user rotates the whip 30 the ball joint 26 rotates there inside of the whip end 24, thereby creating a smooth rotating motion. The ball joint 26, ball joint arm 27, and ball joint aperture 28 are fabricated from materials such as, but not limited to: plastic, metal, wood, or the like.

Figure 4:
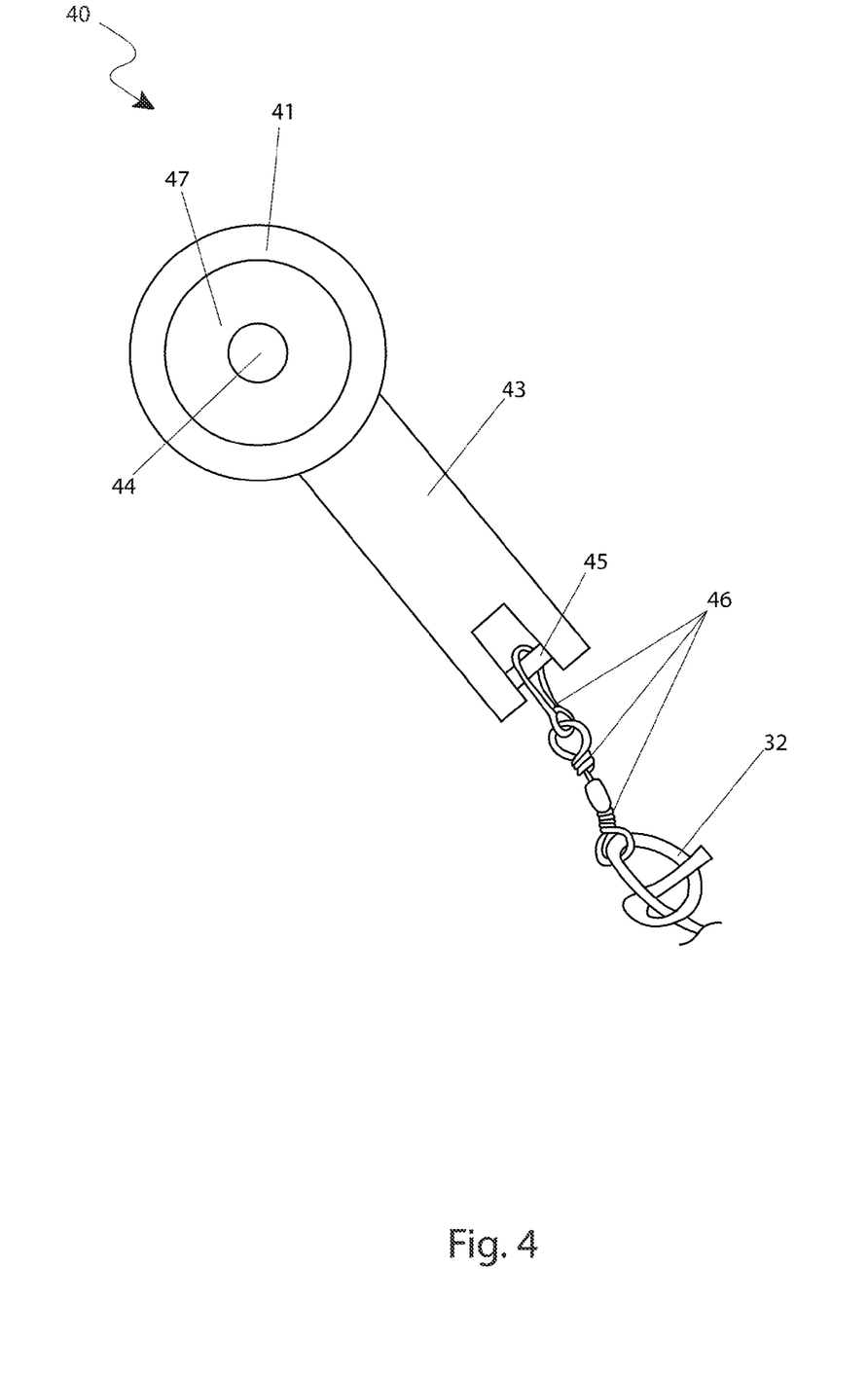
FIG. 4 is a top view of a whistle 40, according to a preferred embodiment of the present invention; and, FIG. 5 is a side view of the whistle 40, according to a preferred embodiment of the present invention.
Figure 5:
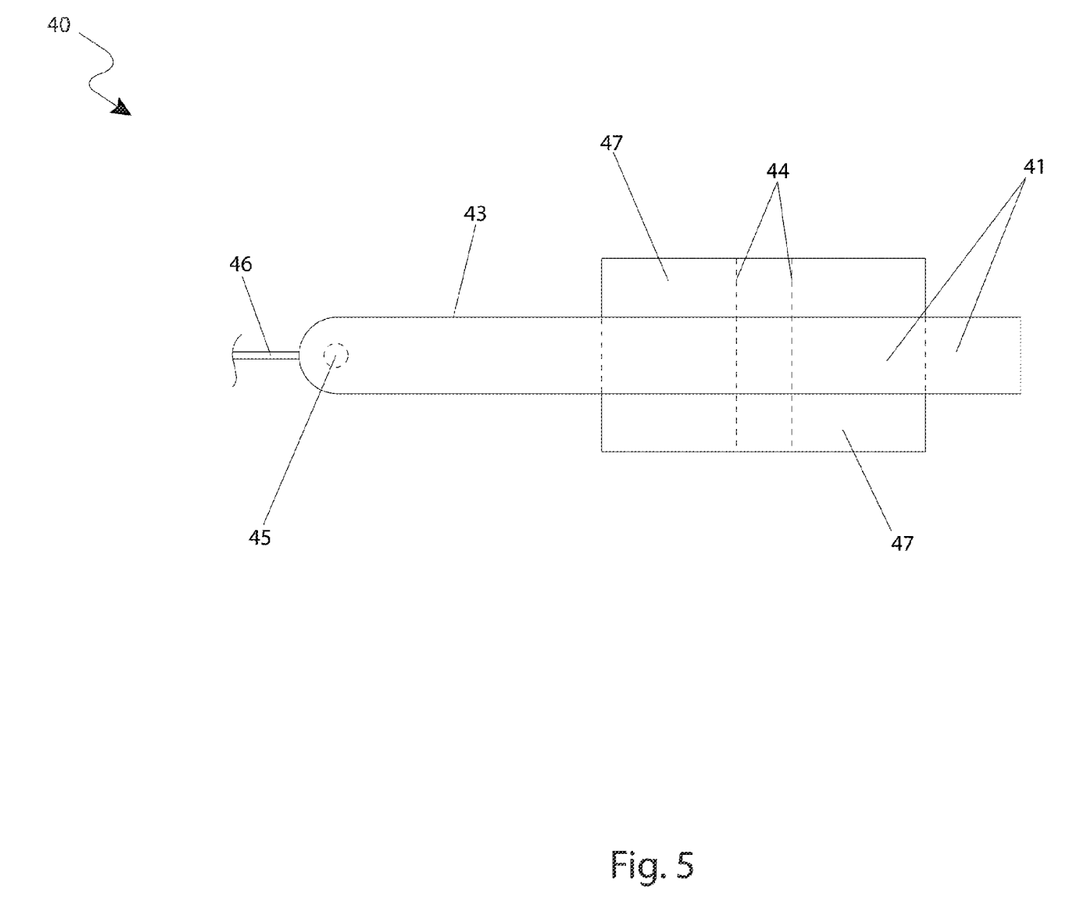

Referring now to FIG. 4, a top view of the whistle 40 and FIG. 5, a side view of the whistle 40, according to the preferred embodiment of the present invention, are disclosed. The whistle 40 is attached to the whip 30 via the second knot 32 which is located thereon an opposite end of the first knot 25. The whistle 40 comprises an upper whistle member 41, a lower whistle member 43, an aperture 44, an axle 45, and a swivel member 47.

The second knot 32 is attached to a swivel member 46, thereby enabling the upper end of the device 10 to rotate along a horizontal axis. The swivel member 46 is preferably a conventional snap fishing swivel which comprises a clip and a pair of rings connected via a pivoting joint, yet other swiveling devices may be utilized without limiting the features of the device 10. The pivoting joint and rings are located on a distal and intermediate section of the swivel member 46 and prevents the whistle 40 from becoming entangled with the whip 30 and also enables the whistle 40 to swing in an appropriate direction to capture the air flow and further produce the sound 42. The clip is located on a proximal end of the swivel member 46 and enables said swivel member 46 to attach to a cylindrical axle 45, thereby connecting the whip 30 to the whistle 40. The clip enables the whistle 40 to rotate in a vertical direction, thereby rotating in the direction of the air flow. The axle 45 is located therebetween a "U"-shaped distal end of a rectangular lower whistle member 43. A proximal end of the lower whistle member 43 is attached via integral molding to a circular upper whistle member 41, thereby providing housing to a circular internal whistle member 47. The internal whistle member 47 extends in an upward and a downward direction from the upper whistle member 41 and comprises an aperture 44, thereby providing a wall structure to capture the air in a desired direction and providing the whistling means to the device 10. The whistle 40 is approximately one (1) inch in diameter and the aperture 44 is approximately one-eighth (⅛) inch in diameter. The internal whistle member 47 is preferably fabricated from metal, but other materials may be incorporated such as, but not limited to: plastic, wood, metal, or the like. The upper whistle member 41 and the lower whistle member 43 are fabricated from materials such as, but not limited to: plastic, metal, wood, or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 1 and 2.

The method of utilizing the device 10 may be achieved by performing the following steps: acquiring the device 10; placing the lanyard 50 therearound the hand or the wrist of a user 70 and gripping the handle 22; moving the rod 20 in a circular motion 60, thereby rotating the ball joint 26 within the whip end 24 and spinning the whip 30; simultaneously spinning the whistle 40 thereabout the swivel member 46; enabling air to collect in the internal whistle member 47 and further to pass through the aperture 44 thereon said internal whistle member 47 located within the upper whistle member 41; and, creating a "whistle" sound 42 from the circular motion 60 of the whistle 40.

An additional method of utilizing the device 10 may be achieved by performing the following steps: acquiring the device 10; approaching livestock to be herded; using the sound 42 being produced to humanely herd the livestock in a desired direction and location; and benefiting from the improved convenience and effectiveness afforded a user of the present device 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An audible prod, further comprising:
    an elongated rod;
    a whip, having a first end attached thereto said elongated rod; and,
    a sound-producing member attached thereto a second end of said whip with a second end attachment means, further comprising:
        a swivel member attached thereto said second end attachment means;
        a whistle attached to said swivel member, further comprising:
            a lower whistle member, comprising an axle disposed between a bifurcated lower end removably attached to said swivel member; and,
            an upper whistle member integrally disposed at an upper end of said lower whistle member;
        wherein said swivel member prevents said whistle from entangling with said whip when said audible prod is in use;
    wherein said second end attachment means further provides additional mass to enable said sound-producing member to produce said audible sound; and,
    wherein a user rapidly motions said audible prod to enact an audible sound produced by said sound-producing member.

2. The audible prod of claim 1, wherein said elongated rod further comprises a lightweight, rigid cylindrical body, further comprising:
    a handle at a first end; and,
    a whip end comprising:
    a receiving member integrally molded to a second end of said rod;
    a ball joint partially encompassing and rotatably connected therein said receiving member; and,
    a ball joint arm integrally molded to said ball joint and outwardly disposed from said ball joint from a proximal end to a distal end comprising a ball joint aperture;
    wherein said handle provides a gripping surface for said user;
    wherein said ball joint provides a smooth rotating motion thereto said whip and said sound-producing member; and,
    wherein said whip is attached to said ball joint aperture with a first end attachment means.

3. The audible prod of claim 2, wherein said elongated rod comprises a material of the following list: thermoplastic, wood, and carbon fiber.

4. The audible prod of claim 2, wherein said elongated rod further comprises an approximate length of two-and-a-half feet and a diameter of one-half inch.

5. The audible prod of claim 3, wherein said handle further comprises a plurality of finger grips.

6. The audible prod of claim 3, wherein said elongated rod further comprises a lanyard adjacent to said handle, thereby providing an additional securing means for said audible prod to said user and a storing means for suspension on a support structure.

7. The audible prod of claim 1, wherein said whip further comprises a durable, flexible length of single-strand or braided material.

8. The audible prod of claim 1, wherein said swivel member is removably attached to said whistle with a clip;
   wherein said clip enables said whistle to rotate in the direction of an air flow during use of said audible prod.

9. The audible prod of claim 8, wherein said upper whistle member further comprises an internal whistle member having a thickness greater than said upper whistle member and further comprising a whistle aperture;
   wherein said upper whistle member provides a housing to said circular internal whistle member; and,
   wherein said whistle aperture produces said audible sound when said audible prod is in use.

10. The audible prod of claim 9, wherein said upper whistle member is approximately one inch in diameter and said whistle aperture is approximately one-eighth inch in diameter.

11. An audible prod, further comprising:
    a lightweight, rigid elongated rod, comprising:
    a handle at a first end;
    a lanyard attached to said elongated rod adjacent to said handle; and,
    a whip end, further comprising:
    a receiving member integrally molded to a second end of said rod;
    a ball joint partially encompassing and rotatably connected therein said receiving member; and,
    a ball joint arm integrally molded to said ball joint and outwardly disposed from said ball joint from a proximal end to a distal end comprising a ball joint aperture;
    a whip, having a first end attached thereto said ball joint aperture with a first end attachment means; and,
    a sound-producing member attached thereto a second end of said whip with a second end attachment means, further comprising:
       a swivel member attached thereto said second end attachment means, thereby preventing said whistle from entangling with said whip when said audible prod is in use;
       a lower whistle member, comprising an axle disposed between a bifurcated lower end removably attached via a clip to said swivel member;
       an upper whistle member integrally disposed at an upper end of said lower whistle member; and,
       an internal whistle member housed within said upper whistle member and having a thickness greater than said upper whistle member, further comprising a whistle aperture producing said audible sound when said audible prod is in use;
    wherein a user rapidly motions said prod to enact an audible sound produced by said sound-producing member;
    wherein said handle provides a gripping surface for said user;
    wherein said lanyard provides an additional securing means for said audible prod to said user and a storing means for suspension of said audible prod on a support structure;
    wherein said ball joint provides a smooth rotating motion thereto said whip and said sound-producing member; and,
    wherein said second end attachment means further provides additional mass to enable said sound-producing member to produce said audible sound.

12. The audible prod of claim 11, wherein said elongated rod comprises a material of the following list: thermoplastic, wood, and carbon fiber.

13. The audible prod of claim 11, wherein said elongated rod further comprises an approximate length of two-and-a-half feet and a diameter of one-half inch, said upper whistle member is approximately one inch in diameter and said whistle aperture is approximately one-eighth inch in diameter.

14. The audible prod of claim 11, wherein said handle further comprises a plurality of finger grips.

15. The audible prod of claim 11, wherein said whip further comprises a durable, flexible length of single-strand or braided material.

16. A method for producing an audible sound with an audible prod comprises the following steps:
    providing said audible prod, comprising a lightweight, rigid elongated rod, further comprising:
    a handle at a first end; and,
    a whip end, further comprising:
       a receiving member integrally molded to a second end of said rod;
       a ball joint partially encompassing and rotatably connected therein said receiving member; and,
       a ball joint arm integrally molded to said ball joint and outwardly disposed from said ball joint from a proximal end to a distal end comprising a ball joint aperture;
    a whip, having a first end attached thereto said ball joint aperture with a first end attachment means; and,
    a sound-producing member attached thereto a second end of said whip with a second end attachment means, further comprising:
       a swivel member attached thereto said second end attachment means, thereby preventing said whistle from entangling with said whip when said audible prod is in use;
       a lower whistle member, comprising an axle disposed between a bifurcated lower end removably attached via a clip to said swivel member;
       an upper whistle member integrally disposed at an upper end of said lower whistle member; and,
       an internal whistle member housed within said upper whistle member and having a thickness greater than said upper whistle member, further comprising a whistle aperture producing said audible sound when said audible prod is in use;

gripping said handle;

motioning said elongated rod in a circular motion, thereby rotating said ball joint within said whip end and spinning said whip and simultaneously spinning said lower whistle member and said upper whistle member thereabout said swivel member; and, enabling air to pass through said whistle aperture of said internal whistle member, thereby producing said audible sound.

17. The method of claim 16, further comprising the steps of:

securing a lanyard to said audible prod adjacent to said handle;

securing said audible prod to a user with said lanyard; and, suspending said audible prod from a support structure with said lanyard.

18. The method of claim 16, further comprising the steps of:

determining a desired direction to herd livestock; and, rapidly rotating said audible prod to produce said audible sound in an opposite direction from said desired direction to herd said livestock in said desired direction.

19. The method of claim 18, further comprising the steps of:

securing a lanyard to said audible prod adjacent to said handle;

securing said audible prod to said user with said lanyard; and, suspending said audible prod from a support structure with said lanyard.

* * * * *